(12) United States Patent
Carlson et al.

(10) Patent No.: US 11,897,530 B2
(45) Date of Patent: Feb. 13, 2024

(54) SELF-CONTAINED MULTI-AXIS ARTICULABLE PLATFORM AND CONTAINMENT SYSTEM FOR FACILITATING TRANSPORT AND DISPERSAL OF BULK MATERIALS AND METHODS FOR EMPLOYING SUCH A SYSTEM

(71) Applicant: DAWSON MANUFACTURES LLC, Crownsville, MD (US)

(72) Inventors: Nicholas Carlson, Crownsville, MD (US); Craig Carlson, Crownsville, MD (US)

(73) Assignee: Dawson Manufactures LLC, Crownsville, MD (US)

(*) Notice: Subject to any disclaimer, the term of this patent is extended or adjusted under 35 U.S.C. 154(b) by 481 days.

(21) Appl. No.: 17/074,592

(22) Filed: Oct. 19, 2020

(65) Prior Publication Data

US 2021/0114642 A1 Apr. 22, 2021

Related U.S. Application Data

(60) Provisional application No. 62/916,309, filed on Oct. 17, 2019.

(51) Int. Cl.
*B62B 3/02* (2006.01)
*B62B 3/08* (2006.01)
*B62B 3/00* (2006.01)

(52) U.S. Cl.
CPC ............. *B62B 3/02* (2013.01); *B62B 3/002* (2013.01); *B62B 3/08* (2013.01)

(58) Field of Classification Search
CPC .............. B62B 3/02; B62B 3/002; B62B 3/08
USPC ............................................................ 298/2
See application file for complete search history.

(56) References Cited

U.S. PATENT DOCUMENTS

| 1,213,938 | A | * | 1/1917 | Norton ...................... | B62B 3/02 |
| | | | | | 280/491.1 |
| 2,593,962 | A | * | 4/1952 | Barker ..................... | B62B 5/067 |
| | | | | | 280/47.38 |
| 2,797,102 | A | * | 6/1957 | Adams ...................... | B62B 3/02 |
| | | | | | 280/30 |
| 2,981,428 | A | * | 4/1961 | Noffsinger .............. | E02F 3/654 |
| | | | | | 414/722 |

(Continued)

FOREIGN PATENT DOCUMENTS

| CN | 210502731 U | * | 5/2020 | ............... B62B 3/02 |
| DE | 10139357 B4 | * | 7/2005 | ............. B62B 3/007 |

(Continued)

*Primary Examiner* — Hilary L Gutman
(74) *Attorney, Agent, or Firm* — TannerIP PLLC; Daniel A. Tanner, III; James E. Golladay, II

(57) ABSTRACT

A self-contained mechanical device is provided that is mountable to a lawn tractor or other similar powered unit, via a standard mounting system, such as a hitch-type mount, for movement of bulk material or heavy objects around a work site or storage facility. The device includes a casterable frame to which a manually or tiltable hopper is mounted. The device also includes a hinge system between the hopper and frame. A knuckle is provided as a connection point to facilitate storage in translation of the device from a substantially horizontal position to a substantially vertical position.

5 Claims, 6 Drawing Sheets

(56) References Cited

U.S. PATENT DOCUMENTS

| | | | | |
|---|---|---|---|---|
| 3,323,837 | A * | 6/1967 | Landry | B62B 1/24 |
| | | | | 298/17.5 |
| RE27,683 | E * | 6/1973 | Rubin | B62B 3/02 |
| | | | | 280/33.998 |
| 4,811,988 | A * | 3/1989 | Immel | B62B 3/08 |
| | | | | D34/16 |
| 5,326,116 | A * | 7/1994 | Flax | B62B 3/02 |
| | | | | D34/17 |
| 5,915,706 | A * | 6/1999 | Mosley | B62B 5/06 |
| | | | | 280/47.26 |
| 10,654,505 | B1 * | 5/2020 | Brooks | B62B 3/001 |
| 10,919,554 | B1 * | 2/2021 | Vaverek | B62B 3/12 |
| 2002/0020989 | A1 * | 2/2002 | Krawczyk | B62B 3/02 |
| | | | | 280/651 |
| 2002/0140190 | A1 * | 10/2002 | Shapiro | B62B 1/206 |
| | | | | 280/655 |
| 2005/0013683 | A1 * | 1/2005 | Henry | B62B 3/08 |
| | | | | 414/469 |
| 2005/0212236 | A1 * | 9/2005 | Tiramani | B27C 9/02 |
| | | | | 280/47.18 |
| 2014/0159464 | A1 * | 6/2014 | Jarvis | B62B 5/067 |
| | | | | 298/2 |
| 2015/0014965 | A1 * | 1/2015 | Gibson | B62B 3/008 |
| | | | | 280/651 |
| 2017/0072976 | A1 * | 3/2017 | Dechant | B62B 5/06 |
| 2017/0203778 | A1 * | 7/2017 | Jackson | B62B 5/0036 |
| 2018/0346009 | A1 * | 12/2018 | Mendoza | B62B 3/022 |
| 2020/0231079 | A1 * | 7/2020 | Lai | B62B 3/02 |

FOREIGN PATENT DOCUMENTS

| | | | | |
|---|---|---|---|---|
| GB | 2223461 A | * | 4/1990 | B60P 1/34 |
| KR | 102133955 B1 | * | 7/2020 | |

* cited by examiner

SELF-CONTAINED MULTI-AXIS ARTICULABLE PLATFORM AND CONTAINMENT SYSTEM FOR FACILITATING TRANSPORT AND DISPERSAL OF BULK MATERIALS AND METHODS FOR EMPLOYING SUCH A SYSTEM

This application claims the benefit of U.S. Provisional Patent Application No. 62/916,309, entitled "A Self-Contained Multi-Axis Articulable Platform And Containment System For Facilitating Transport And Dispersal Of Bulk Materials And Methods For Employing Such A System," filed Oct. 17, 2019, the disclosure of which is hereby incorporated by reference herein in its entirety.

BACKGROUND

1. Field of the Disclosure

This disclosure is directed to exemplary embodiments of specifically-configured mechanical systems, and methods, techniques, processes and/or operating scenarios by which the specifically-configured mechanical systems may be employed to facilitate substantially hands free transport and selective dispersal of bulk materials or heavy loads around job sites, including, but not limited to, constructions sites, landscaping worksites, warehouses and other closed or open storage facilities.

2. Description of the Related Art

Routine transport of bulk materials and heavy loads around a particular site, including a construction site, landscaping worksite, warehouse or other covered/contained or open-air storage facility, is routinely undertaken by using manual wheeled carts that vary in size and/or configuration, often specifically adapted for the particular employment scenario. Such wheeled carts may include, but are not limited to wheeled flat carts, hand trucks, dollies, wagons, wheelbarrows and the like.

These wheeled carts are prolific in filling a gap at various locations where vehicles, including dump trucks, box trucks and other types of transport trucks, and otherwise various sizes and configurations of towed trailers, which are usable to transport the bulk materials or heavy objects to the particular site, would typically prove ineffective in moving the loads around the sites or to specific positions on the sites, particularly in tight spaces, for example, and/or over certain terrain. The wheeled carts are also employed in circumstances in which an investment in powered transport devices including, for example, forklifts and bulk loaders/unloaders would be difficult or otherwise prove prohibitive, or in other circumstances where the use of such devices would also be ineffective or troublesome.

Regardless of the configurations of any manually-pushed/pulled wheeled cart, however, there is typically a finite limit, particularly with respect to weight, to which such a cart can be loaded and still be effectively and efficiently manipulated by hand.

It is well understood that, in areas of a particular site which are accessible by a particular truck or trailer, the unloading evolution may be fairly simple. In these instances, the bulk material or other heavy load is simply off-loaded from the particular truck or trailer to its ultimate delivery site and/or location. Even in optimal conditions or circumstances under such operating scenarios, and certainly in other scenarios in which the truck or trailer cannot be easily maneuvered to a particular location at the ultimate delivery site, some amount of maneuvering of the bulk material or other heavy load may be required using one or more of a tractor, backhoe, forklift, or other powered device. More often, however, the final maneuvering of the bulk material or heavy load to its ultimate delivery site requires manual manipulation of the bulk material or heavy load typically using one or more wheeled carts most effectively chosen from the list above according to the particular load and/or need and/or operating scenario.

It will generally be considered advantageous, or even necessary, to load or overload the wheeled cart in a manner that may be deemed to be most efficient to facilitate the on-site transport evolution in, for example, as few trips as possible.

Numerous attempts have been made at adapting powered wheeled devices and manual wheeled carts to particular purposes in support of particular bulk material or heavy load delivery scenarios. Costs of the movement devices, particularly powered movement devices, are often a driver away from powered movement devices to manual movement devices, while overall load bearing and efficiencies gained from reducing a number of movement evolutions may drive selection of a particular manual wheeled devoice, such as a cart. Such considerations often lead to less-than-optimum employment of less-than-optimum solutions for typical on-site bulk material or heavy load manual handling scenarios.

SUMMARY OF DISCLOSED EMBODIMENTS

It may be advantageous in view of the above and other shortfalls in the currently available market for manual bulk movement devices to produce an on-site material handling system that is usable to move heavier loads around a site in a more effective and efficient manner that is afforded by the current manual solutions, effectively bridging the gap between the powered solutions (which may be too expensive or otherwise substantially unusable in a given operating scenario) and the manual solutions (which may be ineffective or easily overwhelmed or proven inefficient in another given operating scenario).

Exemplary embodiments of the systems and methods according to this disclosure may provide a self-contained mechanical device that is mountable to, for example, a lawn tractor or other similar powered unit, via a standard mounting system, such as a hitch-type mount, to facilitate movement of bulk material or heavy objects around a work site or storage facility.

In embodiments, the disclosed particularly-configured platform or containment system may be usable to independently crawl over most flat or slightly-inclined surfaces, including any lawn or terrain, with ease, driven by, for example, a standard garden or lawn tractor, or other similar powered device.

In embodiments, a tractor front-mounted attached platform or containment system may be provided. Such platform or containment system may be provided with a capacity to articulate left and right, and up and down, via a particularly configured connection and control apparatus, structure or interface, which may be referred to for simplicity throughout this disclosure as a "knuckle."

In embodiments, wheels on the disclosed particularly-configured platform or containment system may be mounted in a manner that allows them freedom to independently swivel or caster, each about a vertical axis, to afford a greatest freedom of movement for the platform or containment system.

In embodiments, the knuckle may be specifically configured to maintain an alignment of the disclosed particularly-configured platform or containment system with the standard mounting system, such as a hitch-type mount, to control lateral precession of the entire system as substantially a single unit.

In embodiments, the knuckle may be otherwise specifically configured to allow a limited or unlimited degree of freedom with regard to lateral precession of the disclosed particularly-configured platform or containment system with regard to the standard mounting system, such as a hitch-type mount.

In embodiments, the knuckle may be specifically configured to provide a capacity by which the disclosed particularly-configured platform or containment system may be "foldable" from a substantially horizontal "in-use" configuration to a substantially vertical "stowed/transport" configuration. In this regard, the configuration of the knuckle may afford ease of transportation or storage of an empty platform or containment system in a configuration in which a user simply lifts a front side (or distal end) of a platform or hopper mounted to the platform as the containment system from its substantially horizontal "in-use" position to a substantially vertical position "stowed/transport" position, in either of which positions the platform or hopper portion may be locked in place by a locking device, which may be associated with the knuckle. Such locking may occur through use of a simple pin and opening cooperation, or may otherwise be lever actuated, for example. Any standard simple mechanical locking system may be used to effect the locking of the platform or hopper portion in either or both of the in-use or stowed/transport positions.

In embodiments, an advantage of a capacity of the platform or containment system to be rotated to the vertical is that its planform "on the floor" is reduced in order that the system is not using up extra space in storage, or on a trailer when being transported to a site for use.

In embodiments, forward-mounted caster arms in a form of one or more distal frame extensions to accommodate the capacity of one or more wheels to fully cater about a vertical axis in order to facilitate full freedom of movement of the distal or outward end of the platform or containment system.

In embodiments in which a pair of forward mounted caster arms are and fully castering wheels are provided, the distal frame extensions may be provided that are adjustable in a horizontal "in-and-out" direction when the platform or containment system is in either of the in-use or stowed/transport position. An advantage of such a configuration facilitates stability, and ease of movement and tracking, in use when in what would be considered a "deployed" configuration of the caster arms, while preserving a capacity to negotiate through a doorway or gate, or around a tight obstacle by retracting the caster arms to a "stowed configuration, within, for example, the lateral footprint of the platform or containment system that the frame elements support. Such a feature may further facilitate ease of handling and safety for stowage and/or transport for a multi-distal wheel configured frame when the platform or containment system is elevated to the stowed/transport position.

In embodiments, a containment system component may be provided in a form of a hopper, including, for example, a poly-type or poly-tube hopper. Otherwise, the containment system component may be in a form of a large tray-type platform with or without significantly raised walls extending individually or collectively, orthogonal to or obliquely from a tray-type platform base.

It is recognized that poly-tube is nothing new, but what may be key in its employment according to certain in-use scenarios is a capacity for a user to easily remove the poly-tube hopper, and to install different attachments to a frame or platform base allowing the user to adapt the platform or containment system to a particular use, such as to move any bulk load or heavy object that the user may desire, and which the hopper may not necessarily accommodate. Examples of component systems include, but are not limited to, a large tray on which to carry plants, a generator to provide on-site electrical power, a watering system or seed/fertilizer system for a medium size farm, a fuel container, a pressure washer, or even a small man lift that may be attachable in order that a user may be able to, for example, safely trim trees, or undertake other elevated tasks like pressure washing or painting a structure. It should be recognized that these are non-limiting examples of the possible known configurations or adaptations that may be mountable to a frame of the disclosed particularly-configured platform unit.

In embodiments, the hinged capacity between the platform or platform frame and any manner of implement mounted to the platform or platform frame may be powered through the use of manual or automated actuators pistons, rams, or the like, under pneumatic or hydraulic operation in order that, with a push of a button, the platform, containment system or other implement may be made to adjust automatically in the vertical, such as, for example, to reposition under power or to dump automatically. Manual lift handles that may be fixed in the plane of the frame, or may be manipulable through a particular arc to optimize an ability to most effectively manipulate the platform or hopper in cooperation with the hinges to tilt the platform or the hopper from its substantially horizontal in-use position to a tilted or dump position may be provided.

These and other features, and advantages, of the disclosed systems and methods are described in, or apparent from, the detailed description of various exemplary embodiments discussed below.

BRIEF DESCRIPTION OF THE DRAWINGS

Various exemplary embodiments of the disclosed systems and methods for providing a self-contained mechanical device that is mountable to, for example, a lawn tractor or other similar powered unit, via a standard mounting system, such as a hitch-type mount, to facilitate movement of bulk material or heavy objects around a work site or storage facility. will be described, in detail, with reference to the following drawings, in which.

DESCRIPTION OF EMBODIMENTS

The systems and methods for providing an articulable platform or containment system for facilitating substantially hands free transport and selective dispersal of bulk materials and/or heavy loads around job sites, including, but not limited to constructions sites, landscaping worksites, warehouses and other storage facilities according to this disclosure will generally refer to these specific utilities for the disclosed systems, methods, processes, techniques and/or schemes of movement.

Exemplary embodiments described and depicted in this disclosure should not be interpreted, however, as being specifically limited to any particular configuration of a system, which may be tractor-driven, to accomplish the above function, any particular configuration of a containment system or other implement mountable to a frame in the manner generally outlined above, and as will be described in greater detail below, or to any particular bulk material or other heavy load to be transported by the disclosed platform or containment system.

It should be recognized that any advantageous use of schemes for facilitating the movement of bulk materials or heavy loads around a particular site that may employ devices and/or methods such as those presented in this disclosure is contemplated as being included within the scope of the disclosed exemplary systems and methods.

The disclosed systems and methods will be described as being particularly adaptable for use in the delivery, for example, of bulk mulch or other aggregate materials around a landscaping site powered by a standard lawn tractor. This description, and the associated references, are intended to provide a particular, real-world use case in which the systems and methods according to this disclosure may be particularly beneficially employed or otherwise adapted for use. These references are intended to be illustrative only and should not be considered as limiting the disclosed systems and methods to any particular embodiment, application, operational scenario or use case. Generic reference will be made to comparatively more efficient bulk material handling, and bulk material movement, at a delivery site to be illustrative of the advantages that may be achieved through implementation of the disclosed systems, methods and schemes.

Figure 1:
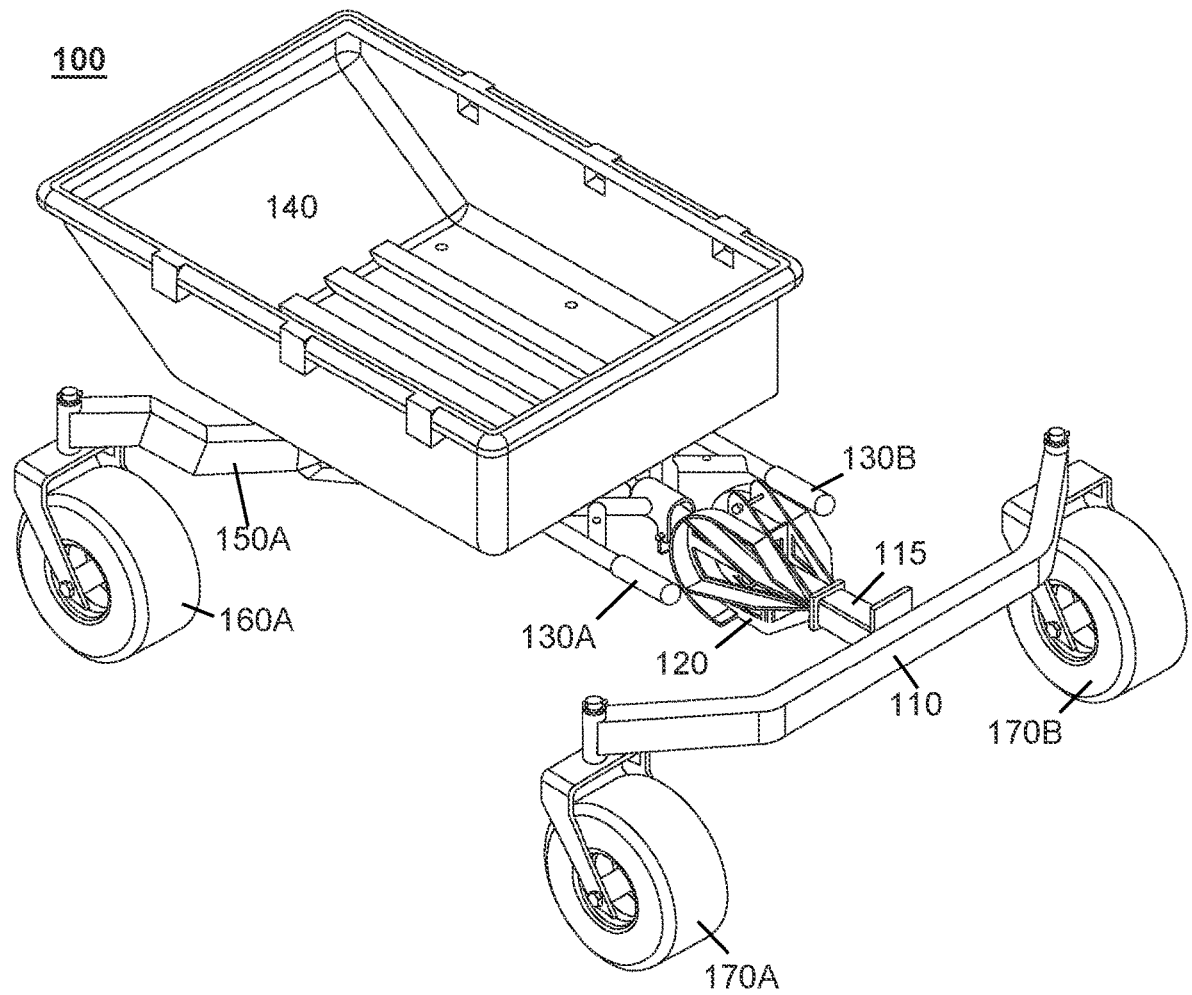
FIG. 1 illustrates a schematic diagram of a first perspective view of an exemplary embodiment of a self-contained mechanical bulk material or heavy object moving device according to this disclosure.

FIG. 1 illustrates a schematic diagram of a first perspective view of an exemplary embodiment of a self-contained mechanical bulk material or heavy object moving device according to this disclosure. As shown in FIG. 1, the disclosed platform or containment system 100 may be "mountable" directly to, for example, a lawn tractor or other power unit by, or otherwise represented by, interface or interface unit 110 with exemplary wheels 170A/B, which may be partially or fully casterable, as shown. Such mounting may be via a standard mounting system 115, such as, for example, a standard hitch-type mount, to facilitate movement of bulk material or heavy objects around a work site or storage facility.

In embodiments, a tractor front-mounted platform or containment system 100 may be provided with one or more freely-castering wheels (160A shown in FIG. 1, and 160B shown in several of the other drawings discussed below). It should be noted that a consistent numbering scheme will be used for all of FIGS. 1-6.

In embodiments, the freely-castering wheel(s) 160A, 160B may allow the disclosed platform or containment system 100 to articulate left or right in the horizontal plane and, as will be shown in greater detail below, to pivot up and down between an "in-use" position and a "stow/transport" position according to a particularly-configured connection and control apparatus, structure or mechanical interface 120, which may be referred to for simplicity as a "knuckle 120."

In embodiments, the knuckle 120 may be specifically configured to maintain alignment of the disclosed platform or containment system 100 with the standard mounting system 115 to control lateral precession of the entire system as a substantially single unit with little to no lateral displacement or articulation between the platform or containment system 100 and the standard mounting system 115 in the horizontal plane.

In embodiments, the knuckle 120 may be otherwise specifically configured to allow a limited or unlimited degree of freedom of lateral displacement or articulation in lateral precession of the disclosed platform or containment system 100 with regard to the standard mounting system 115 in the horizontal plane.

When a single freely-castering wheel is presented at a distal end of the frame of the disclosed platform or containment system 100 it may be provided on a fixed frame extension. When a pair of freely-castering wheels 160A shown in FIG. 1 (and 160B shown in several of the other drawings discussed below) are provided, each of the pair of freely-castering wheels may be independently mounted to a movable frame extension 150A shown in FIG. 1 (and a movable frame extension 150B shown in several of the other drawings discussed below).

In embodiments, the disclosed platform or containment system 100 may include a hopper 140 as an example of a component that may be mounted to the disclosed platform or containment system 100, and may otherwise include cooperating handles 130A,130B, by which a platform, or the hopper 140, or another mechanical implement, may be independently manipulated with respect to the other components of the disclosed platform or containment system 100. The handles 130A,130B may be fixed in a configuration substantially parallel to a longitudinal axis of the platform or containment system 100 in the manner shown in FIGS. 1-4, or may be otherwise maneuverable or displaceable partially or completely out of a the parallel configuration as appropriate to most efficiently manipulate the platform, or hopper 140, to a tilted or dump position as will be described below with reference to FIG. 2.

Figure 2:
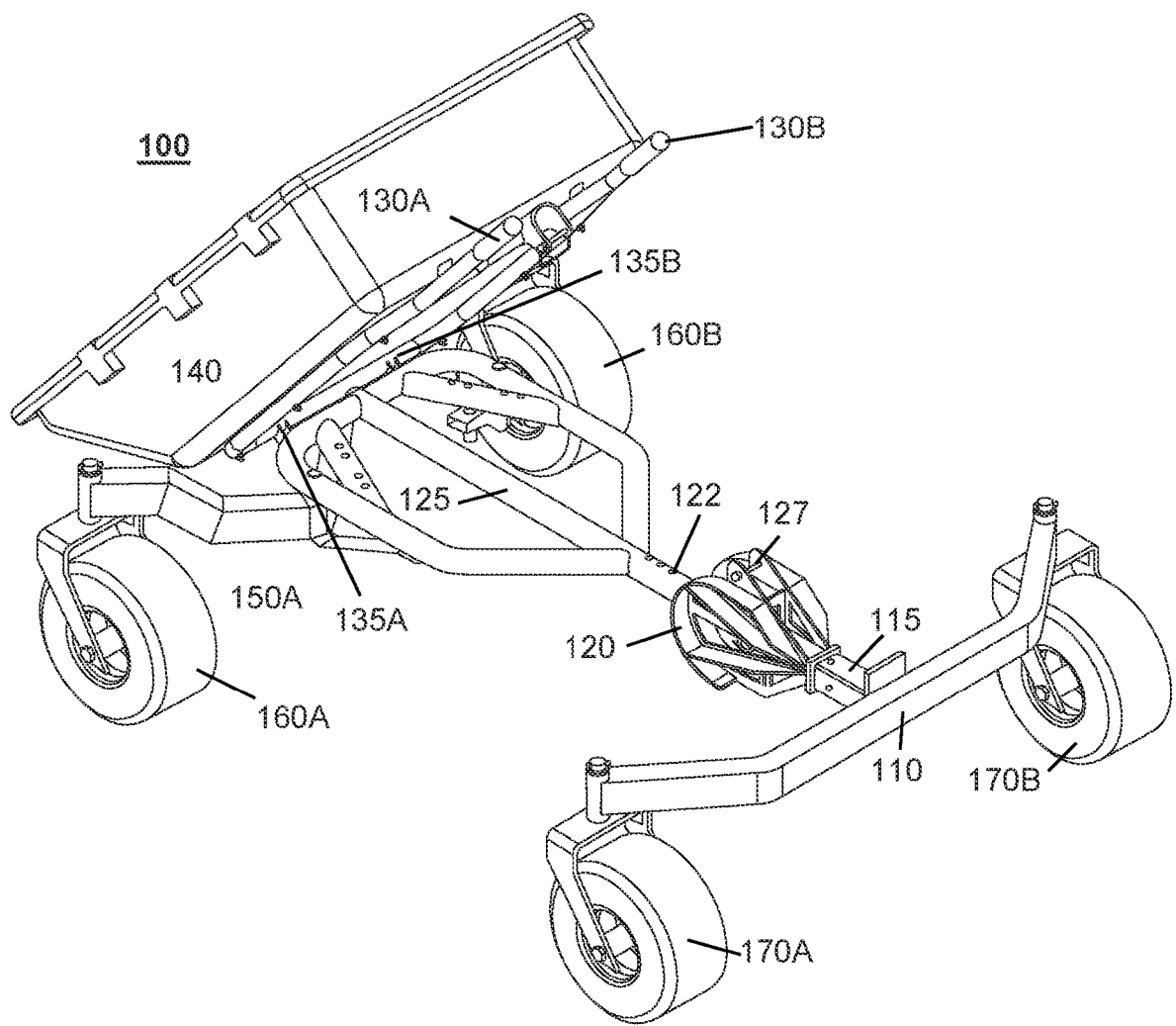
FIG. 2 illustrates a schematic diagram of a second perspective view of an exemplary embodiment of a self-contained mechanical bulk material or heavy object moving device according to this disclosure.

FIG. 2 illustrates a schematic diagram of a second perspective view of an exemplary embodiment of a self-contained mechanical bulk material or heavy object moving device according to this disclosure. As shown in FIG. 2, the disclosed platform or containment system 100 may include a frame 125. The frame 125 may include a connection component 122 by which the frame 125 may be engaged with the knuckle 120. The disclosed platform or containment system 100 may include one or more hinged connection components 135A,135B, by which the platform, or the hopper 140, or another mechanical implement, may be mounted to the frame 125 in a manner that cooperating handles 130A,130B, may be used to articulate or tilt the platform, or the hopper 140, or the another mechanical implement, with respect to the frame 125, as shown in FIG. 2 to, for example, "dump" a load from the platform, or the hopper 140.

FIG. 2 shows a perspective view of the hopper 140 being pivoted around the one or more hinged connection components 135A,135B, by lifting one or both of the handles 130A,130B, to thereby dump the load of, for example, bulk material from the hopper 140 onto the ground.

It should be noted that wheels 160A,160B may be of substantially any configuration, but are intended to provide a capacity by which the disclosed platform or containment system 100 may be usable to independently crawl over most flat or inclined surfaces, including any lawn or terrain with ease, when driven by the standard garden or lawn tractor.

Figure 3:
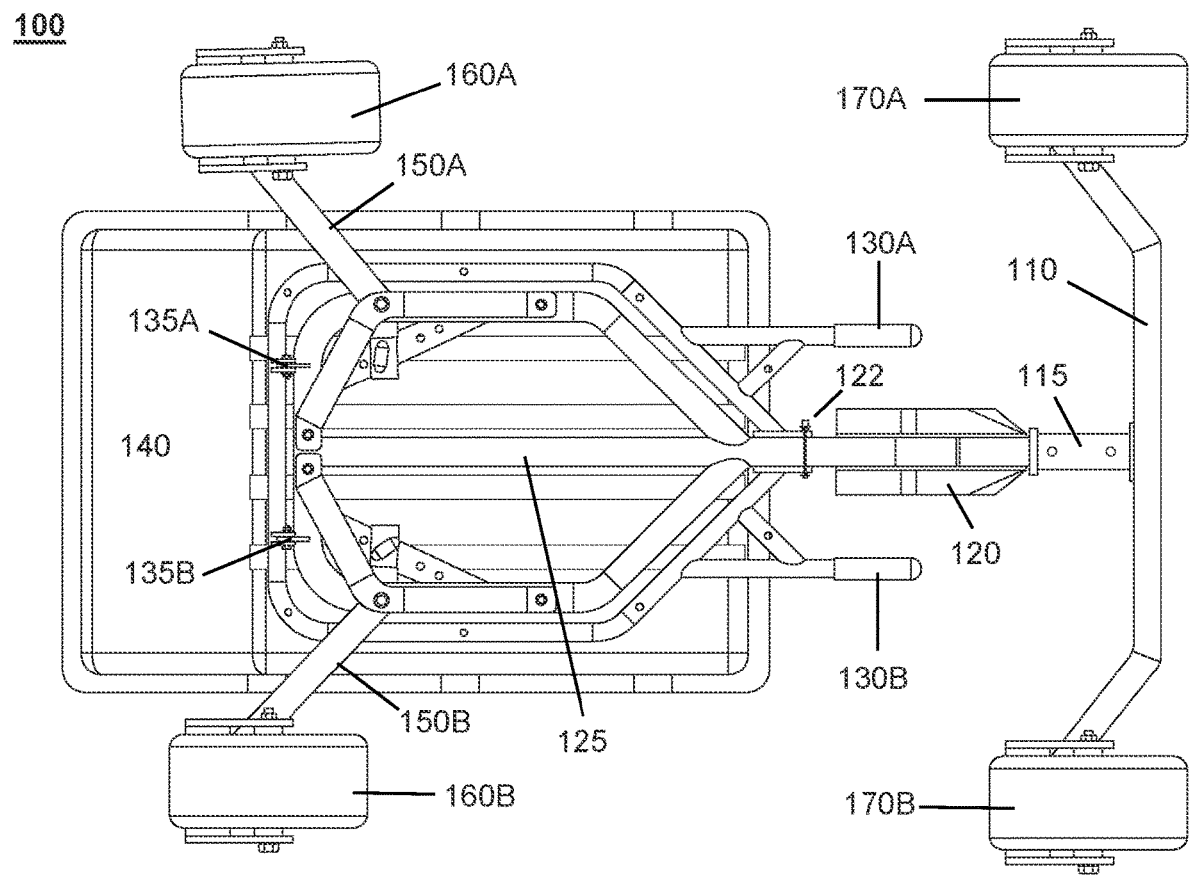
FIG. 3 illustrates a schematic diagram of a first underside view of an exemplary embodiment of a self-contained mechanical bulk material or heavy object moving device according to this disclosure.

FIG. 3 illustrates a schematic diagram of a first underside view of an exemplary embodiment of a self-contained mechanical bulk material or heavy object moving device according to this disclosure. In FIG. 3, the underside view of the disclosed platform or containment system 100 shows generally, from right to left, the disclosed platform or containment system 100 as potentially including the standard mounting system 115, which may be of a standard hitch-type, by which the disclosed platform or containment system 100 may be attached to the interface or interface unit 110, including to, for example, to a tractor, lawn tractor or other vehicle or motorized unit to power movement of the disclosed platform or containment system 100. The knuckle 120 may be interposed between the standard mounting system 115, and the frame 125 via an extended unit, such as the connected component 122.

The handles 130A,130B may be manually manipulated, in the manner shown above between FIGS. 1 and 2, to cause the platform, hopper 140 or other implement to be pivoted around the one or more hinged connection components 135A,135B, such as for dumping the load.

As shown in FIG. 3 above, and in FIG. 4 discussed in more detail below, the disclosed platform or containment system 100 may include forward-mounted frame extensions 150A,150B that are adjustable in a horizontal "in-and-out" direction when the disclosed platform or containment system 100 is in either of an in-use position (as shown in FIG. 3), or a stowed/transport position (as will be discussed in more detail below with reference to FIG. 6). In the depiction in FIG. 3, the forward-mounted frame extensions 150A, 150B are shown in their deployed configuration in which at least a portion of the wheels extends beyond a planform of the frame or of the platform or the hopper 140 mounted to the frame 125. This configuration facilitates stability and ease of movement and tracking of the platform or containment system 100 in general use. In a single wheel version, a tradeoff is made between this stability and an ease of use for certain lighter loads.

Figure 4:
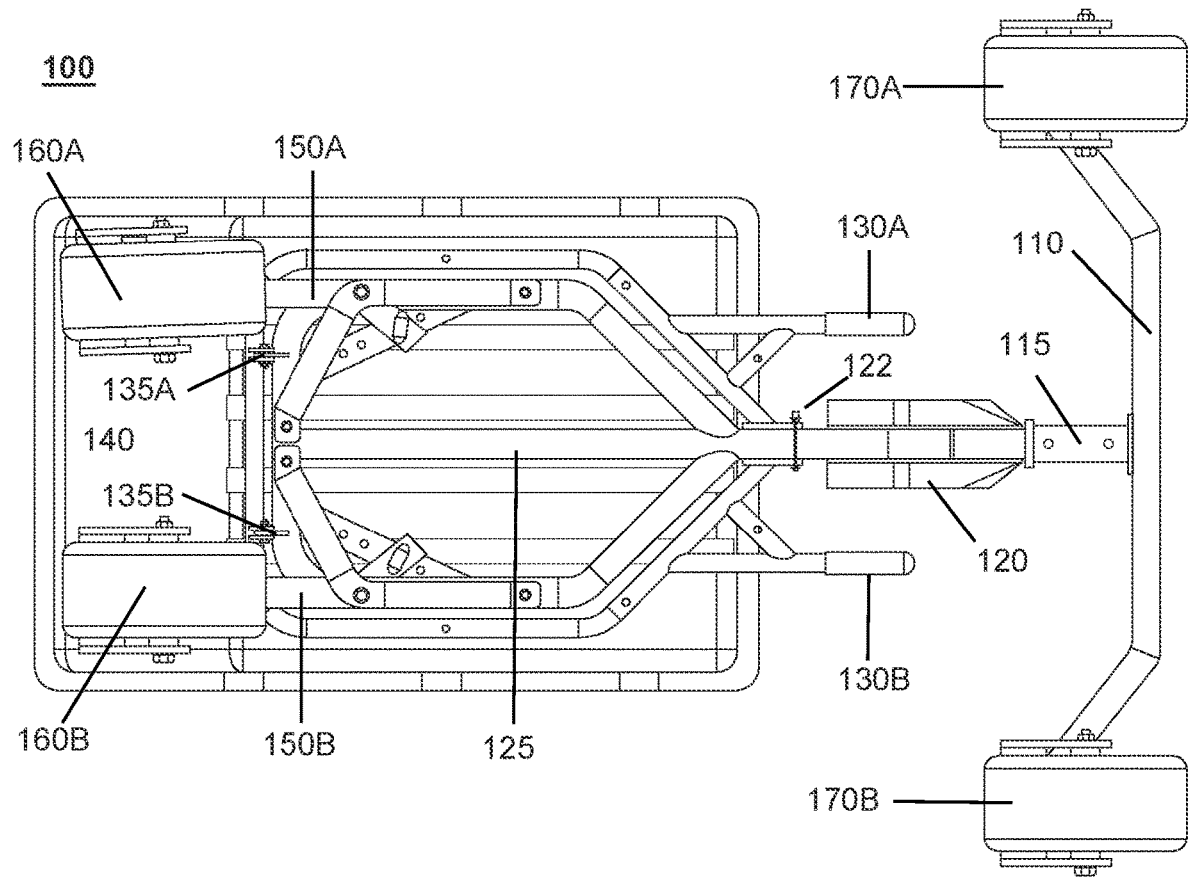
FIG. 4 illustrates a schematic diagram of a second underside view of an exemplary embodiment of a self-contained mechanical bulk material or heavy object moving device according to this disclosure.

FIG. 4 illustrates a schematic diagram of a second underside view of an exemplary embodiment of a self-contained mechanical bulk material or heavy object moving device according to this disclosure. As shown in FIG. 4, the forward-mounted frame extensions 150A,150B of the disclosed platform or containment system 100 are shown in their stowed position in which no portion of the wheels extends beyond a planform of the frame, or of the platform or the hopper 140 mounted to frame 125. This position of the forward-mounted frame extensions 150A,150B for the disclosed platform or containment system 100 may preserve a capacity for the user to negotiate through a doorway or gate, for example, or around a tight obstacle by selectively retracting the frame extensions 150A,150B from their deployed configuration to their stowed configuration, as shown respectively in FIGS. 3 and 4.

Such a feature may further facilitate ease of handling and safety for stowage and/or transport when the disclosed platform or containment system 100 is elevated to the stowed/transport position, as will be discussed in further detail below with regard/reference to FIG. 6.

In either of the deployed configuration or the stowed configuration, the forward-mounted frame extensions 150A, 150B of the disclosed platform or containment system 100 may be held in one or the other of the configurations according to a physical configuration of the forward-mounted frame extensions 150A,150B, or may be otherwise held in the one or the other of the configurations by a separate locking device, which may be in a form, for example of a pin and a cooperating set of openings to accommodate a pin, or other similar mechanical locking device configuration.

Figure 5:
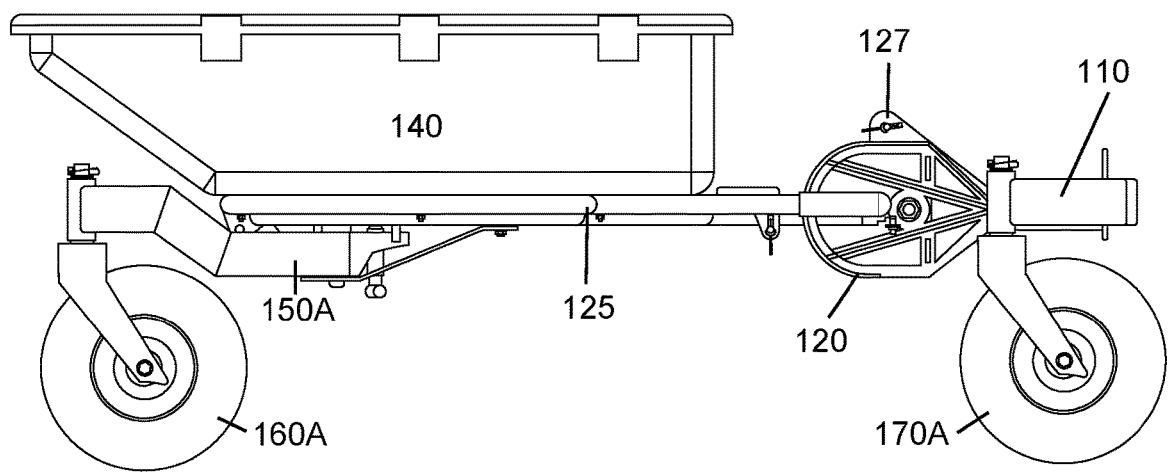
FIG. 5 illustrates a schematic diagram of a first side view of an exemplary embodiment of a self-contained mechanical bulk material or heavy object moving device, in an "in-use" configuration, according to this disclosure.

FIG. 5 illustrates a schematic diagram of a first side view of an exemplary embodiment of a self-contained mechanical bulk material or heavy object moving device in an "in-use" configuration of the disclosed platform or containment system 100 according to this disclosure. FIG. 6 illustrates a schematic diagram of a second side view of an exemplary embodiment of a self-contained mechanical bulk material or heavy object moving device of the disclosed platform or containment system 100 according to this disclosure.

Figure 6:
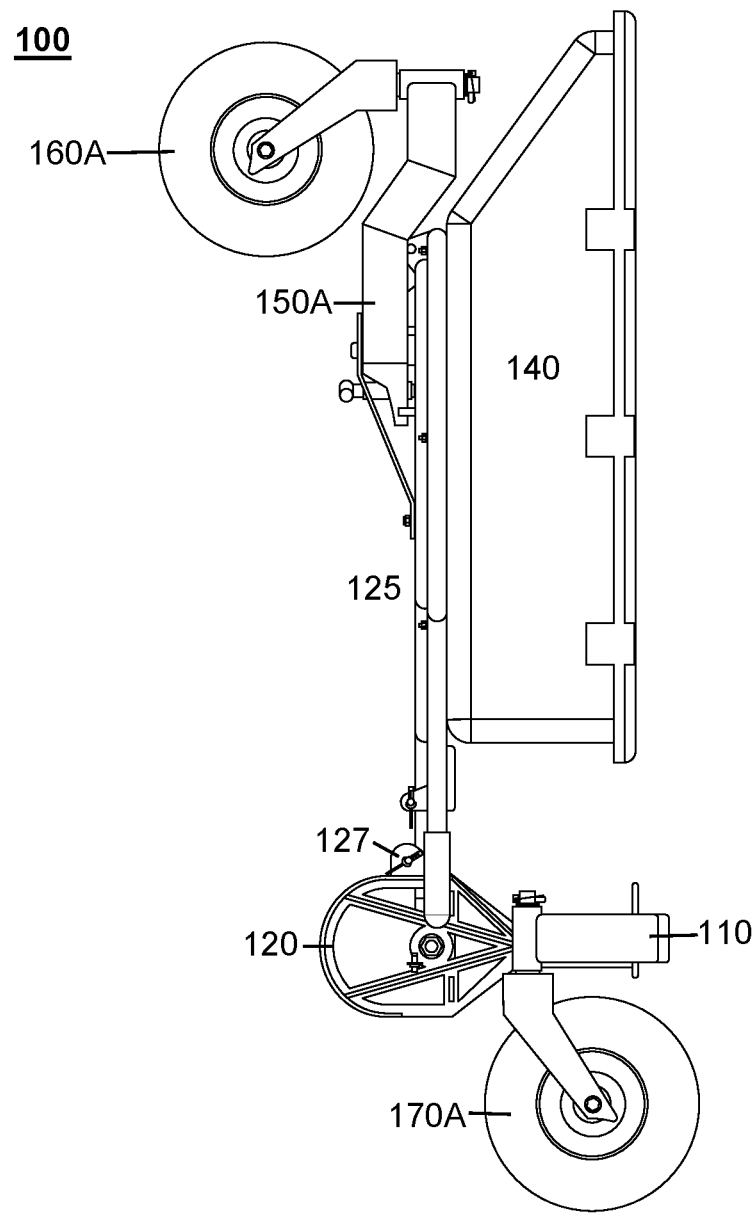
FIG. 6 illustrates a schematic diagram of a second side view of an exemplary embodiment of a self-contained mechanical bulk material or heavy object moving device, in a "stowed/transport" configuration, according to this disclosure.

In embodiments as shown in FIGS. 5 and 6, the knuckle 120 may be specifically configured to provide a capacity by which the platform or containment system 100 may be "foldable." In this regard, the configuration of the knuckle 120 may afford ease of transportation or storage of an empty platform or containment system 100 and the configuration in which a user simply lifts a front side (or distal end) of a platform or hopper 140 mounted to the platform 125 as the containment system from a substantially horizontal "in-use" position, as shown in FIG. 5, to a substantially vertical "stowed/transport" position, as shown in FIG. 6.

The platform or hopper portion may be locked in place through the use of a locking device 127, which may be in a simple pin and opening configuration used to lock the frame 125 and its extended portion 122 in a particular position with respect to the knuckle 120. An advantage of a capacity of the disclosed platform or containment system 100 included capability that the platform or hopper to rotated to a vertical is that the planform or "footprint" of the disclosed platform or containment system 100 "on the floor" is reduced in order that the platform or containment system 500/600 system 100 is not using up any extra space in storage, or on a trailer when being transported to a site for use.

FIG. 4 illustrates a schematic diagram of a second underside view of an exemplary embodiment of a self-contained mechanical bulk material or heavy object moving device In embodiments, a containment component may be provided in a form of a hopper 140, including, for example, a poly-tube hopper. Otherwise, the containment component may be in a form of a large tray-type platform with or without significantly raised walls extending individually or collectively, orthogonal to, or open likely from, the platform base. It is recognized that poly-tube is nothing new, but what may be key in its employment according to certain in-use scenarios is a capacity for the user to remove the poly-tube hopper and install different attachments to the frame 125, or other platform base, allowing the user to adapt the disclosed platform or containment system as shown in exemplary form in each of FIGS. 1-6 to a particular use. Such uses may be to move any bulk load, or heavy object, that the user may desire.

Examples of additional component systems that may be mounted to the frame 125 include, but are not limited to, a large tray, a fuel tank, a generator to provide on-site electrical power, a watering system, a seed/fertilizer system for a medium-size farm, a pressure washer, or even a small man lift, which may be attachable in order that a user may be able to, for example, safely trim trees, or undertake other elevated tasks like pressure washing or painting of the outside of a structure.

The disclosed platform or containment systems are simple in it their construction and operation, and are readily reconfigurable around the basic concept shown. As such, the disclosed platform or containment system may be capable of being economically manufactured, and sold to a broad spectrum of individuals and/or small entity companies that may benefit from the full implementation of schemes employing the disclosed exemplary platform or containment system.

The disclosed systems are intended to overcome the shortfalls in the related art by filling a gap between small manually-manipulated wheeled carts, and large and expensive powered bulk material and heavy object movement devices. In this regard, the disclosed exemplary systems represent a particular improvement over currently-available wheeled manual carts and bulk material and heavy object moving devices.

Using a simple, straight-forward "cart" powered by a standard garden or lawn tractor for moving all material and/or heavy objects around a particular site the disclosed systems may provide significant improvements over all currently-available systems and methods, which may be considered in some way similar to the disclosed systems and schemes for using those systems.

Further, the above-described and other benefits may inure in other operational employments and operational scenarios for the disclosed systems and methods well outside the movement of all material and/or heavy loads around a particular site. The potential cost savings in measurable and immeasurable efficiencies are boundless.

Specific reference to, for example, the above-discussed embodiments for the disclosed exemplary platform or containment systems for all material and heavy load manipulation around the site, and characteristics of the exemplary embodiments specifically directed to use in such operating scenarios, should not be interpreted to constrain the disclosed systems, methods, techniques, schemes, processes, products or product components to only those embodiments.

The depicted and described embodiments are included for non-limiting illustration of the disclosed concepts for implementing these systems, methods, techniques, processes and schemes for more efficient aggregate delivery that include, but are not limited to, use of the depicted systems for transporting bulk material or heavy loads around the site, as shown. All of the above depictions and/or descriptions should, therefore, be interpreted as being exemplary only, and not limiting the disclosed systems or schemes for using those systems, in any manner.

Features and advantages of the disclosed embodiments are set forth in this disclosure and may be, at least in part, obvious from this detailed description, or may be learned by practice of the disclosed embodiments. The features and advantages of the disclosed embodiments may be realized and obtained by means of the instruments and combinations of features particularly described.

Various embodiments of the disclosed systems and methods are discussed in this disclosure. While specific implementations are discussed, it should be understood that this is done for illustration purposes only. A person skilled in the relevant art will recognize that other components and configurations may be used without departing from the spirit and scope of the disclosed embodiments.

We claim:

1. A material delivery system, comprising:
   a frame;
   at least one wheel mounted to the frame;
   a frame connecting component that is configured (1) to cooperate with a mount to facilitate connecting the frame to a powered device and (2) to facilitate positioning the frame between a substantially horizontal position with respect to the mount and a substantially vertical position with respect to the mount,
   the frame comprising one or more hinged connection components configured to connect a hopper to the frame in a manner that the the hopper, is tiltable with respect to the frame,
   wherein:
      the at least one wheel comprises a pair of wheels, each of the pair of wheels being casterable around a substantially vertical axis;
      each of the pair of wheels is mounted to an independent frame extension;
      each independent frame extension is movable with respect to the frame to position each of the pair of wheels between a first position in which at least a portion of each of the pair of wheels extends beyond a planform of the frame, and a second position in which no portion of each of the pair of wheels extends beyond the planform of the frame.

2. The material delivery system of claim 1, further comprising one or more handles associated with the hopper,
   wherein the hopper is tilted with respect to the frame through user manipulation of the one or more handles.

3. The material delivery system of claim 2, the one or more handles being fixed with respect to the hopper, and substantially aligned with a longitudinal axis of the frame when the hopper is in a non-tilted configuration with respect to the frame.

4. The material delivery system of claim 2, the one or more handles being movable with respect to the hopper to facilitate manual tilting of the hopper with respect to the frame.

5. The material delivery system of claim 1, the at least one wheel being mounted to a distal end of the frame opposite the frame connecting component.

* * * * *